(12) United States Patent
Bornemann

(10) Patent No.: US 7,763,824 B2
(45) Date of Patent: Jul. 27, 2010

(54) CABLE MANAGEMENT SYSTEM FOR PLASMA CUTTER

(75) Inventor: Brian J. Bornemann, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/278,626

(22) Filed: Apr. 4, 2006

(65) Prior Publication Data

US 2007/0235422 A1 Oct. 11, 2007

(51) Int. Cl.
*B23K 10/00* (2006.01)

(52) U.S. Cl. ............... 219/121.39; 219/121.47; 219/137.9

(58) Field of Classification Search ............. 219/137 R, 219/137 PS, 121.54, 121.57, 121.48, 121.39, 219/121.44, 121.45, 121.46, 75, 75 R
See application file for complete search history.

(56) References Cited

U.S. PATENT DOCUMENTS

| | | | |
|---|---|---|---|
| 4,963,830 A * | 10/1990 | Roth et al. ............... 324/715 |
| 5,172,924 A * | 12/1992 | Barci ..................... 280/14.22 |
| 5,800,106 A * | 9/1998 | Miller ..................... 410/117 |
| 6,536,568 B1 | 3/2003 | Tong |
| 2002/0008125 A1 | 1/2002 | Caputi |
| 2005/0057912 A1* | 3/2005 | Hardt et al. ............... 361/826 |
| 2005/0252889 A1* | 11/2005 | Stanzel et al. ............. 219/74 |
| 2005/0258155 A1* | 11/2005 | DeYoung ................ 219/130.1 |
| 2006/0016772 A1 | 1/2006 | Plzak |

FOREIGN PATENT DOCUMENTS

| DE | 202006015816 U1 | 12/2006 |
|---|---|---|
| JP | 01005672 A | 1/1989 |

* cited by examiner

*Primary Examiner*—Mark H Paschall
(74) *Attorney, Agent, or Firm*—Fletcher Yoder P.C.

(57) ABSTRACT

The present invention is related to a cable management system for a plasma cutter. The cable management system uses a flexible strap that is affixed to the housing of the plasma cutter and a loop is formed in the cable. The loop can be opened to align and position the cable with respect to the strap and the loop then can be easily closed to encircle the cable to secure the cable to the housing of the plasma cutter. By the present system, the portable plasma cutter can be transported by a user and the cables are securely fastened to the housing so as to prevent the cable from dragging or otherwise present a burden to the transportation of the plasma cutter.

16 Claims, 3 Drawing Sheets

CABLE MANAGEMENT SYSTEM FOR PLASMA CUTTER

BACKGROUND OF THE INVENTION

The present invention relates generally to plasma cutting systems, and, more particularly, to a system for managing the cables of a plasma cutter.

Plasma cutting is a process in which an electric arc is used for cutting or gouging a workpiece. The plasma cutter is generally contained within a housing and provides output power to a pair of cables that extend from the plasma cutter apparatus. One of the cables has a torch that is located at the outer end of the cable and the other cable has a work clamp at its outer end that is adapted to be attached to the workpiece.

The plasma cutter apparatus is designed to be a portable unit. That is, the plasma cutter can be carried by a person from location to location. With such portability, however, there is a problem with management of the cables since they are not easy to carry along with the plasma cutter housing and can be unwieldy to handle. As such, the user must carry the cables in hand where the cables can inadvertently drag on the ground or otherwise make the carrying of the plasma cutter quite difficult. Not only is the problem concerned with the facility to carry the plasma cutter, but a cable hanging downwardly from its connection to the plasma cutter can create undue stress on the strain relief mechanism at that connection and a dragging or loose cable can more likely snag on some object and damage that connection or the cable.

The problem is exacerbated with the level of portability and as technology decreases the size of the plasma cutter, the cables become a greater percentage of the volume and weight of the plasma cutter and thus the management and handling of the cables becomes a more important aspect to consider.

According it would advantageous to have a cable management system that would overcome the aforedescribed problems by securing the cable to the housing of the plasma cutter to facilitate the hand transporting of the plasma cutter.

SUMMARY OF THE INVENTION

Therefore, in accordance with the present invention, there is a cable management system for a plasma cutter that is used to secure one or more cables to the housing of the plasma cutter. The cable management system comprises a strap that has a proximal end affixed to the housing of the plasma cutter and the strap forms a loop through which the cable, which can be wound into multiple loops, can pass such that the cable is secured proximate to and overhangs a side of the plasma cutter. The secured cable thus does not hinder the hand carrying of the plasma cutter by the user.

In the exemplary embodiment, the strap is formed of a first and second strap portions, each having proximal and distal ends. The proximal ends are affixed to the plasma cutter housing and the distal ends have connectors that can be joined together and separated easily. As such, the user can join the first and second strap portions together to form the loop and just as easily, separate the connectors to open the loop.

When the loop is opened, the cable can be placed against the strap whereupon the connectors can be joined together to form the loop and encircle the cable to secure that cable to the housing of the plasma cutter. The connectors can be snap connectors or other types of connectors that allow the user to easily affix the ends together and to separate the ends, when desired, to release the cable from its secured position to the housing of the plasma cutter.

As a further feature, the proximal ends of the first and second strap portions can be affixed to the upper surface of the housing of the plasma cutter at a location equidistant between the opposite sides of the housing by means of a pivotable affixation so that the strap can be rotated 180 degrees such that the loop can be positioned proximate to and overhang either of the opposite sides of the housing as desired by the user.

The size of the loop is preferably adjustable so that the user can size the loop in accordance with the number and size of the cables that are enclosed by the loop.

In one embodiment, the cable management system of the present invention can be affixed either to the housing of the plasma cutter or, alternatively, to the carrying strap that is provided to enable the user to easily carry the plasma cutter.

These and other features and advantages of the present invention will become more readily apparent during the following detailed description taken in conjunction with the drawings herein.

DETAILED DESCRIPTION OF THE PREFERRED EMBODIMENT

Figure 1:
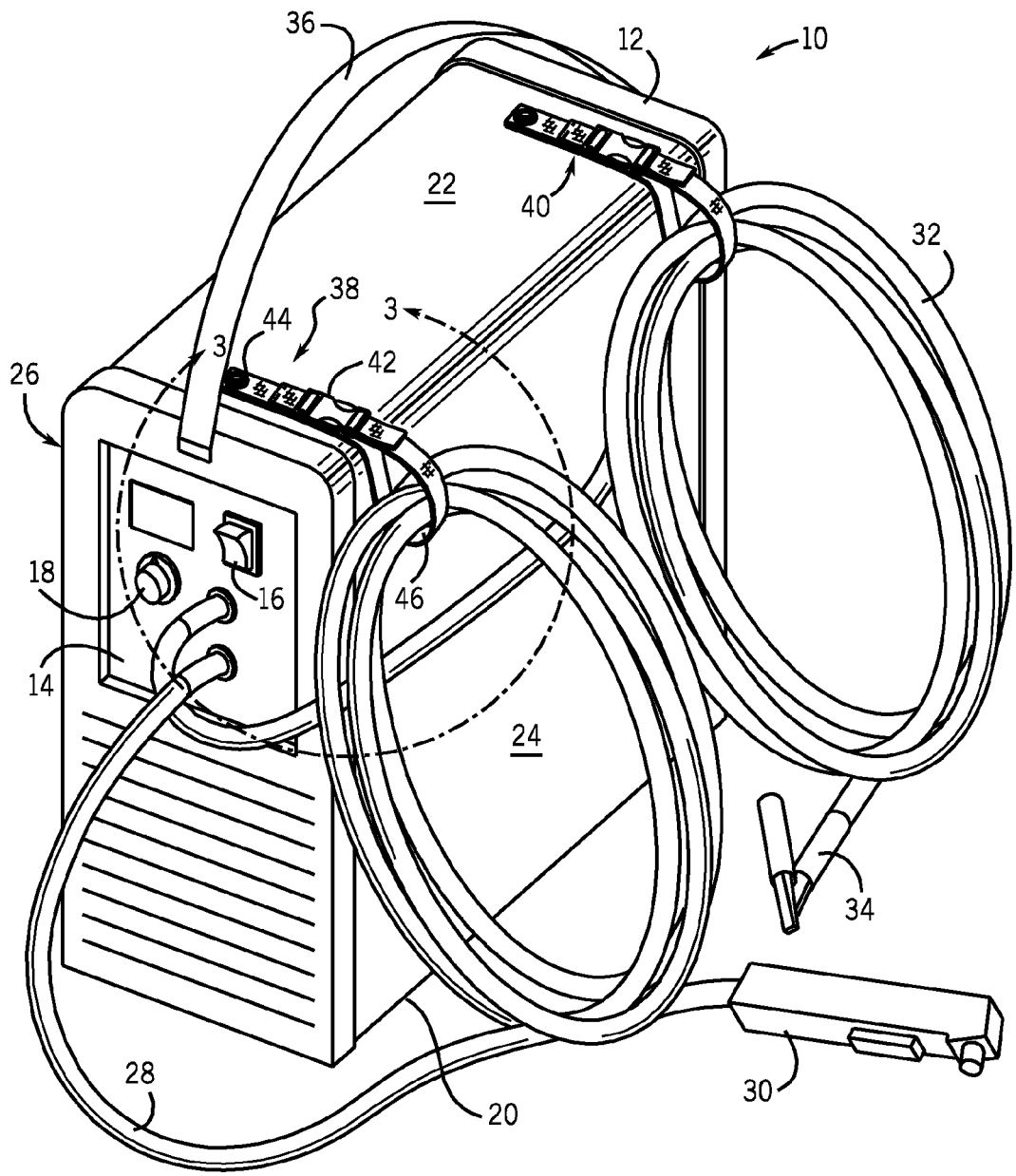
FIG. 1 is a perspective view of a plasma cutter utilizing the cable management system of present invention.

Turning first to FIG. 1, there is shown a perspective view of the cable management system constructed in accordance with the present invention employed on a plasma cutter 10. As can be seen, the plasma cutter 10 has a housing 12 that encloses and protects the various components that make up the plasma cutter 10. At one end of the housing 12 there is a panel 14 that includes certain control devices for the convenience of the user and may include an on-off switch 16 and a mode selector dial 18 that enables the user to select a desired mode of operation of the plasma cutter 10, i.e. between a cutting or gouging mode.

The housing 12 has a bottom surface 20, an upper surface 22 and opposite sides 24, 26. As also can be seen, there is a torch cable 28 that is connected at the panel 14 and has a torch 30 at its free end to carry out the process of cutting or gouging as is conventional. There is also a clamp cable 32 that has a work clamp 34 at its free end and which is clamped to the workpiece during the operation of the plasma cutter 10. A power cord, not shown, also extends from the plasma cutter for connection to a source of power.

A carrying strap 36 is affixed to the housing 12 and extends upwardly in order to facilitate the carrying of the plasma cutter 10 by a person and it should be noted that the plasma cutter 10 is of a size and weight that it is readily portable and can be carried from location to location by a person.

The present cable management systems 38, 40 are also shown in the FIG. 1 and only the cable management system 38 will be described in detail, it being understood that both cable management system 38, 40 are generally of the same construction. As such the cable management system 38 comprises a strap 42 having a proximal end 44 that is affixed to the upper surface 22 of the housing 12 and forms a loop 46 located distally of the proximal end 44. The loop 46 is located proximate to and overhangs the side 24.

As shown, the point or location where the proximal end 44 of the strap 42 is affixed to the upper surface 22 is preferable equidistant between the two sides 24, 26, that is, the point of affixation of the proximal end 44 of the strap 42 is centered between the opposite sides 24, 26. The dimensions of the strap 42 are such that the loop 44 extends over the side 24. In an exemplary embodiment, the affixation of the proximal end 44 of the strap 42 to the housing 12 is a pivotable connection such that the strap 42, if desired, by the user, can be rotated 180 degrees and thus have the loop 46 extend over the opposite side 26 from that shown in FIG. 1 such that the loop 46 is then located proximate to and overhangs the side 26. As such, there is versatility in the use of the strap 42 since it can be used to affix the cables 28, 32 along either side 24 or 26 of the housing 12.

The means of affixation of the strap 42 to the housing 12 may be by a threaded bolt, rivet or other suitable means that firmly attaches the strap 42 to the housing 12 while allowing the pivoting feature heretofore described.

The loop 46 can, therefore, be seen to hold the coils of the torch cable 28 and allow the transporting of the plasma cutter 10 with the torch cable 28 affixed to the housing 12 so as not to drag or be burdensome to carry the plasma cutter 10. As also can be seen the clamp cable 32 is also secured to the housing 12 in the same manner by the user of the cable management system 40. For convenience, the loop 46 can be opened to position the torch cable 28 against the strap 42 and the loop 46 can then be closed to secure the torch cable 28 in the desired, secured position with the loop 46 encircling the torch cable 28.

Figure 2:
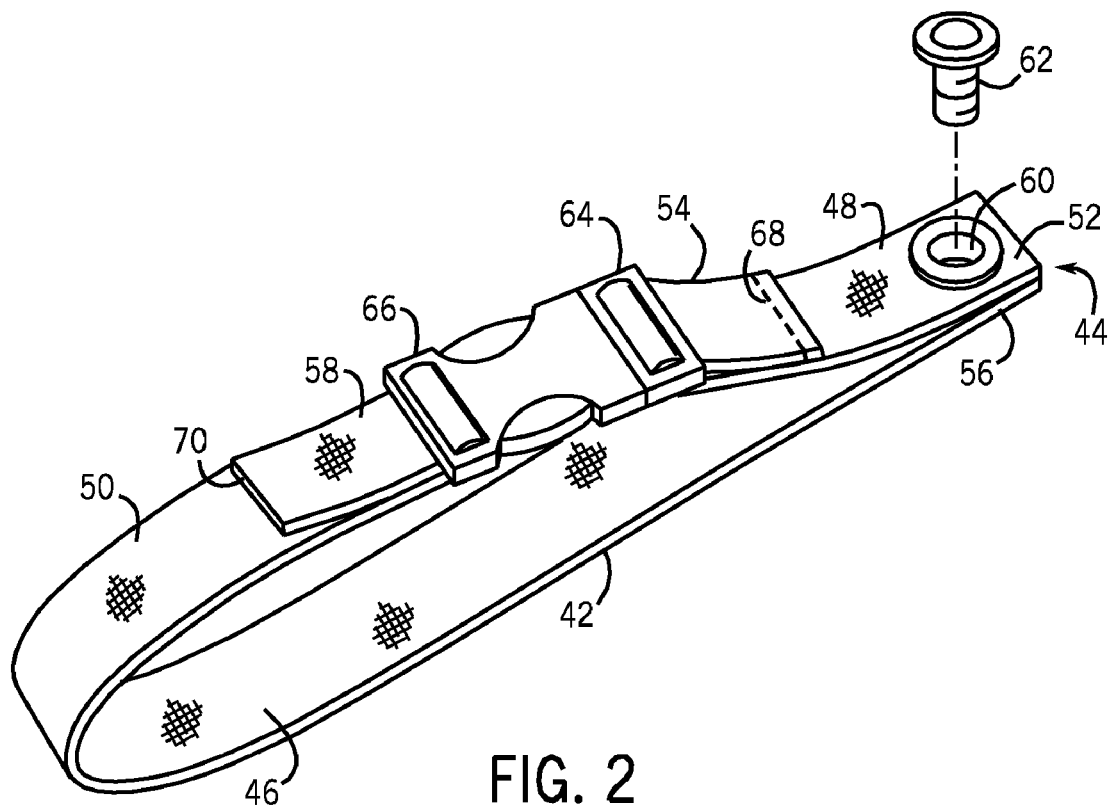
FIG. 2 is a an enlarged perspective view of the cable management strap of the present invention.

Turning now to FIG. 2, there is shown a perspective view of the strap 42 in order to illustrate the manner of opening and closing the loop 46. Thus the strap 42 is comprised of a first strap portion 48 and a second strap portion 50. The first strap portion 48 has a proximal end 52 and a distal end 54 and likewise, the second strap portion 50 also has a proximal end 56 and a distal end 58. As can be seen, the proximal ends 52, 56 of the first and second portions 48, 50 are aligned and there is an opening 60 that passes through both the proximal ends 52, 56 for passage of a threaded bolt 62 that can be used to secure the distal end 44 of the strap 42 to the housing 10 (FIG. 1).

At the distal ends 54, 58 of the first and second strap portions 48, 50 there are connectors 64, 66 respectively, and which interconnect to fasten the distal ends 54, 58 together. The connectors 64, 66 are illustrated in FIG. 2 to be snap connectors and which interfit together with a snap action, however, other connectors can be used, such as a buckle, Velcro hook and loop fastening system or other non-permanent affixation means as long as the particular connectors allow the distal ends 54, 58 to be readily connected and just as readily disconnected by the user.

As also can be seen in FIG. 2, with one connector, shown as connector 64, the first strap portion 48 passes through the connector 64 and stitches 68 hold the connector 64 thereto. With the other connector 66, the second strap portion 50 passes through connector 66 with a free end 70 so that the second strap portion 50 can be adjusted with respect to the connector 66 to effectively adjust the size of the loop 46. As such, the user can determine the size of the loop 46 needed to encircle a cable and make the necessary adjustment.

Figure 3:
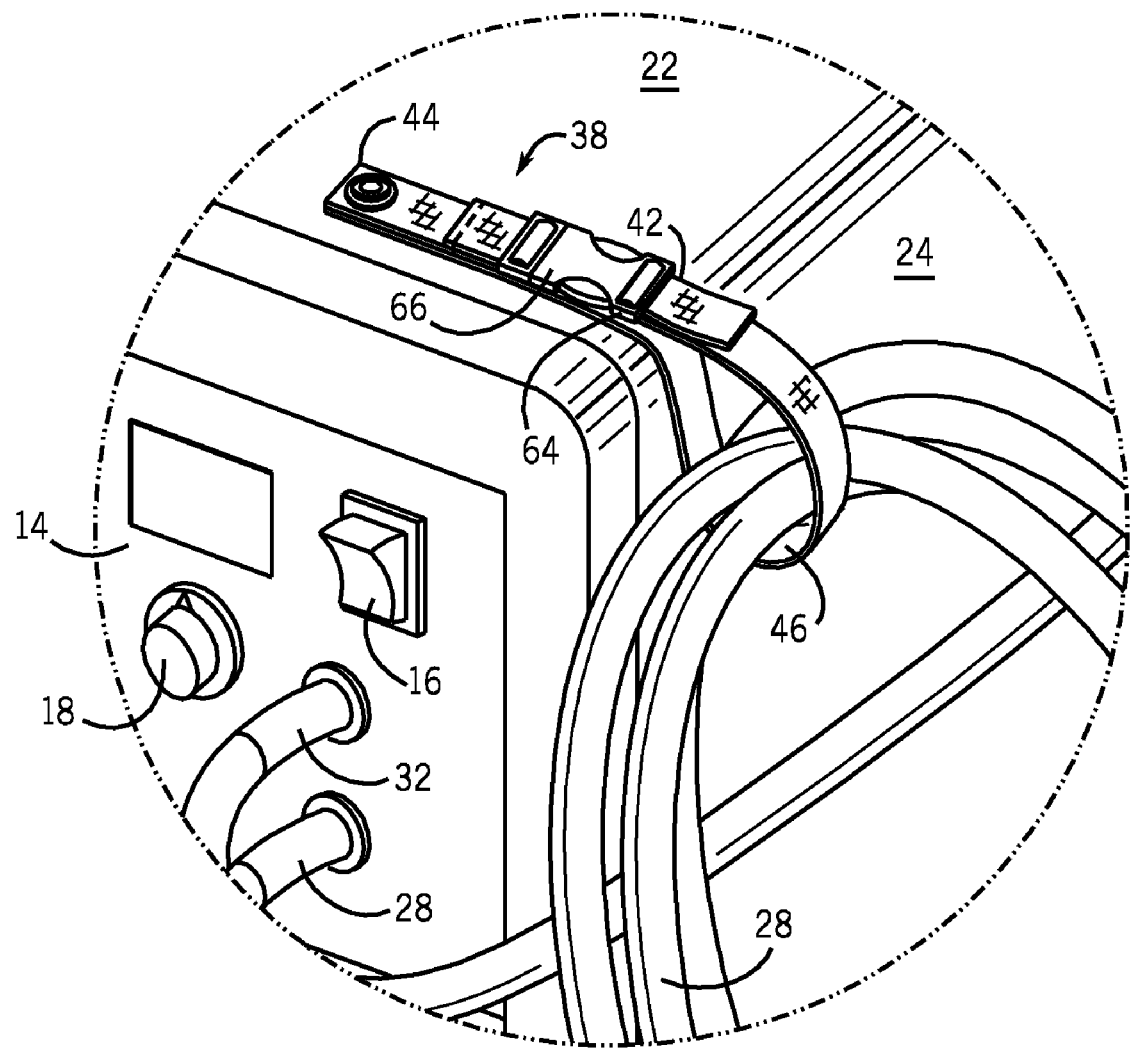
FIG. 3 is an enlarged perspective view of the present cable management system taken along the arrows 3-3 of FIG. 1.

Turning finally to FIG. 3, there is shown an enlarged perspective view of the cable management system 38 of the present invention taken along the circled area 3-3 of FIG. 1. As such, there can be seen the torch cable 28 that has been coiled and is supported within the loop 46 and thereby securely attached to the housing 12. The loop 46 is closed by means of the affixation together of the connectors 64 and 66 such that the strap 42 is holding the torch cable 28 against the side 24 so that the plasma cutter 10 can be transported by a person and the torch cable 28 is safely secured to the housing 12. As noted, the same securement is carried out with the clamp cable 32 (FIG. 1) so that both the torch cable 28 and the clamp cable 32 do not hinder the transportation of the plasma cutter 10 as carried by a user.

Those skilled in the art will readily recognize numerous adaptations and modifications which can be made to the cable management system of the present invention which will result in an improved system, yet all of which will fall within the scope and spirit of the present invention as defined in the following claims. Accordingly, the invention is to be limited only by the following claims and their equivalents.

What is claimed is:

1. A plasma cutter apparatus comprising:
a plasma cutter housing having a cable extending therefrom; and
a torch cable strap and a clamp cable strap each having first and second strap portions, the first and second strap portions having proximal ends adapted to be affixed to the housing, and having distal ends releasably joined together to form a loop to securely retain the cable to the housing, wherein each distal end of the first and second strap portions has a connector that interfits with each other to form the loop, and wherein the proximal ends of the first and second portions of the torch cable strap are each affixed to a first common location of the housing between two opposing sides of the housing and the proximal ends of the first and second strap portions of the clamp cable strap are each affixed to a second common location of the housing between the two opposing sides.

2. The plasma cutter apparatus of claim 1 wherein the cable is a torch cable.

3. The plasma cutter apparatus of claim 1 wherein the cable is a clamp cable.

4. The plasma cutter apparatus of claim 1 wherein at least one of the distal ends of the first and second strap portions is slidingly adjustable to a connector to allow an adjustment of the size of the loop.

5. The plasma cutter apparatus of claim 4 wherein the connector is a snap fit connector that can be snapped together.

6. The plasma cutter apparatus of claim 1 wherein each of the proximal ends of the strap portions has a hole formed therein for passage of a bolt to affix the proximal ends to the housing.

7. The plasma cutter apparatus of claim 1 wherein the torch cable strap and the clamp cable strap are comprised of a flexible material.

8. The plasma cutter apparatus of claim 1 wherein the proximal ends of the first and second portions of the torch cable strap are each affixed to the first common location via a pivotable connection enabling the loop formed by the torch cable strap to be rotated between the two opposing sides of the housing and enabling the loop to securely retain the cable along either of the two opposing sides of the housing.

9. The plasma cutter apparatus of claim 8 wherein the first common location of the housing is equidistant between the two opposing sides of the housing.

10. A plasma cutter apparatus comprising:
a plasma cutter housing having a torch cable and a clamp cable extending therefrom;
a torch cable strap having first and second torch cable strap portions, the first and second torch cable strap portions having proximal ends adapted to be affixed to the housing, and having distal ends releasably joined together to form a first loop to securely retain the torch cable to the housing, and wherein each distal end of the first and second torch cable strap portions has a connector that interfits with each other to form the first loop; and a clamp cable strap having first and second clamp cable strap portions, the first and second clamp cable strap portions having proximal ends adapted to be affixed to the housing, and having distal ends releasably joined together to form a second loop to securely retain the clamp cable to the housing, and wherein each distal end of the first and second torch clamp strap portions has a connector that interfits with each other to form the second loop;

wherein the proximal ends of the first and second torch cable strap portions are each affixed to the housing at a first common location of the housing between two opposing sides of the housing via a first pivotable connection enabling the first loop formed by the torch cable strap to be rotated between the two opposing sides of the housing and enabling the first loop to securely retain the torch cable along either of the two opposing sides of the housing, and wherein the proximal ends of the first and second clamp cable strap portions are each affixed to the housing at a second common location of the housing between the two opposing sides of the housing via a second pivotable connection enabling the second loop formed by the clamp cable strap to be rotated between the two opposing sides of the housing and enabling the second loop to securely retain the clamp cable along either of the two opposing sides of the housing.

11. The plasma cutter apparatus of claim 10 wherein at least one of the distal ends of the first and second strap portions of at least one of the straps is slidingly adjustable to a connector to allow an adjustment of the size of the respective loop.

12. The plasma cutter apparatus of claim 10 wherein the connector of at least one of the straps is a snap fit connector that can be snapped together.

13. The plasma cutter apparatus of claim 10 wherein each of the proximal ends of the strap portions of at least one of the straps has a hole formed therein for passage of a bolt to affix the proximal ends to the housing.

14. The plasma cutter apparatus of claim 10 wherein at least one of the straps is comprised of a flexible material.

15. The plasma cutter apparatus of claim 10 wherein the first and second loops and the first and second common locations of the housing are configured such that the first and second loops extend from the first and second common locations, respectively, and over an edge of at least one of the two opposing sides of the housing.

16. The plasma cutter apparatus of claim 10 wherein the first and second common locations of the housing are each equidistant between the two opposing sides of the housing.

* * * * *